United States Patent
Srivastava et al.

(10) Patent No.: US 9,105,268 B2
(45) Date of Patent: Aug. 11, 2015

(54) METHOD AND APPARATUS FOR PREDICTING INTENT IN IVR USING NATURAL LANGUAGE QUERIES

(71) Applicant: 24/7 CUSTOMER, INC., Campbell, CA (US)

(72) Inventors: Vaibhav Srivastava, Bangalore (IN); Ravi Vijayaraghavan, Bangalore (IN); Robin Dautricourt, Redmond, WA (US)

(73) Assignee: 24/7 Customer, Inc., Campbell, CA (US)

( * ) Notice: Subject to any disclaimer, the term of this patent is extended or adjusted under 35 U.S.C. 154(b) by 15 days.

(21) Appl. No.: 14/029,672

(22) Filed: Sep. 17, 2013

(65) Prior Publication Data
US 2014/0079195 A1     Mar. 20, 2014

Related U.S. Application Data

(60) Provisional application No. 61/703,162, filed on Sep. 19, 2012.

(51) Int. Cl.
| | |
|---|---|
| *G10L 15/22* | (2006.01) |
| *G10L 15/00* | (2013.01) |
| *G10L 15/26* | (2006.01) |
| *H04M 3/523* | (2006.01) |
| *H04M 3/51* | (2006.01) |

(52) U.S. Cl.
CPC .............. *G10L 15/22* (2013.01); *G10L 15/005* (2013.01); *G10L 15/26* (2013.01); *H04M 3/5166* (2013.01); *H04M 3/523* (2013.01)

(58) Field of Classification Search
CPC ....... G10L 15/005; G10L 15/22; G10L 15/26; H04M 3/523; H04M 3/5166
USPC .......... 704/231, E15.003, E15.04; 379/265.1, 379/907
See application file for complete search history.

(56) References Cited

U.S. PATENT DOCUMENTS

| | | | |
|---|---|---|---|
| 2002/0135618 | A1 | 9/2002 | Maes et al. |
| 2004/0215453 | A1* | 10/2004 | Orbach .................... 704/231 |
| 2010/0250243 | A1 | 9/2010 | Schalk et al. |
| 2010/0324898 | A1 | 12/2010 | Chen |
| 2013/0202100 | A1* | 8/2013 | Fagundes ................ 379/265.1 |
| 2013/0282430 | A1* | 10/2013 | Kannan et al. ............. 705/7.29 |
| 2014/0006293 | A1* | 1/2014 | Chang et al. ................ 705/304 |
| 2014/0044243 | A1* | 2/2014 | Monegan et al. .......... 379/88.01 |
| 2014/0207518 | A1* | 7/2014 | Kannan et al. ............. 705/7.29 |
| 2014/0249873 | A1* | 9/2014 | Stephan et al. ............ 705/7.11 |
| 2014/0270147 | A1* | 9/2014 | Williams et al. ......... 379/266.07 |
| 2014/0355748 | A1* | 12/2014 | Conway et al. ............ 379/265.1 |
| 2014/0355749 | A1* | 12/2014 | Conway et al. ............ 379/265.1 |
| 2015/0010134 | A1* | 1/2015 | Erel et al. .................. 379/88.01 |

FOREIGN PATENT DOCUMENTS

WO     WO-02/073331     9/2002

* cited by examiner

*Primary Examiner* — Fan Tsang
*Assistant Examiner* — Van D Huynh
(74) *Attorney, Agent, or Firm* — Michael A. Glen; Perkins Coie LLP

(57) ABSTRACT

An IVR system is disclosed in which customer experience is enhanced by improving the accuracy and intent prediction capabilities of an interactive voice response system. Customers are allowed to make a natural language queries to specify their intent, while the accuracy of traditional IVR systems is maintained by using key features in language along with the customer's past transactions, CRM attributes, and customer segment attributes to identify customer intent.

18 Claims, 6 Drawing Sheets

METHOD AND APPARATUS FOR PREDICTING INTENT IN IVR USING NATURAL LANGUAGE QUERIES

CROSS REFERENCE TO RELATED APPLICATIONS

This application claims priority to U.S. provisional patent application Ser. No. 61/703,162, filed Sep. 19, 2012, which is incorporated herein in its entirety by this reference thereto.

BACKGROUND OF THE INVENTION

1. Technical Field

The invention relates to field of Interactive Voice Response (IVR) technology. More particularly, the invention relates to customer relationship management and, more particularly, to enhancing the customer experience by improving the accuracy and intent prediction capabilities of IVR systems.

2. Description of the Background Art

Interactive voice response (IVR) technology is deployed between a customer and a customer care executive to automate the process of serving the customer at least in part. IVR systems are often criticized as being unhelpful and difficult to use due to their poor design and the fact that they tend to show a lack of appreciation of the customer's needs.

Some IVR-based systems permit customers to speak out the action the customer desires to perform, rather than requiring the customer to push one or more keys to specify the action. Such IVR systems use speech recognition algorithms to recognize the speech of the customer and then perform actions corresponding to the speech of the customer.

Modern systems are very accurate in predicting customer intent based on the customer's speech. The high degree of accuracy exhibited by modern IVR systems results from the use of a very specific grammar, for which the speech recognition system in such IVRs is trained. Because of this, these systems are often referred to as directed voice IVRs. This approach, however, leads to a conflict between the need to provide the customer with the freedom to speak their intent and the accuracy of the system because such systems are restricted to recognizing only the specific set of terms within the grammar for an action. This constrains the customer to speak these specific terms when using the IVR system. Current IVR systems try to balance such conflict and provide a level of service which maximizes the customer experience. However, such systems fail to do so as the customer progresses from a generic description of the problem into specific concerns because of customer directed decision making during the customer's journey. Typically, the customer intent can encompass 30-100 different items. All of these different intents cannot be considered when providing direction to the customer because of the limits to human attention span. To solve this problem, traditional IVRs group these intents hierarchically. Overall, these types of directed conversation have multiple recognition points and, hence, lead to frustration in customers because the customers do not get to solve their problems in the IVR and are, instead, transferred.

SUMMARY OF THE INVENTION

In the disclosed IVR system, the customer experience is enhanced by improving the accuracy and intent prediction capabilities of an interactive voice response system. Customers are allowed to make a natural language queries to specify their intent, while the accuracy of traditional IVR systems is maintained by using key features in language along with the customer's past transactions, CRM attributes, and customer segment attributes to identify customer intent.

DETAILED DESCRIPTION OF THE INVENTION

Predicting Intent in IVR Using Natural Language Queries

Embodiments of the invention also allow customers to make natural language queries to specify their intent while maintaining the accuracy of traditional IVR systems. This is accomplished by using key features in human or spoken language along with the customer's past transactions, customer relations management (CRM) system attributes, and customer segment attributes to identify customer intent.

Figure 1:
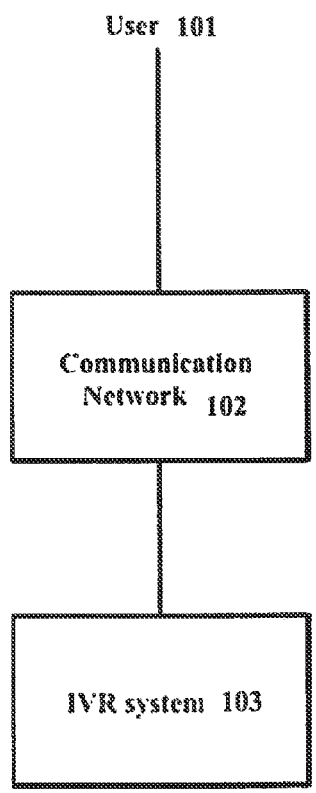
FIG. 1 is a block schematic diagram showing a system for enabling a customer to interact with an IVR system according to the invention.

FIG. 1 is a block schematic diagram showing a system for enabling a customer to interact with an IVR system according to the invention. In an embodiment of the invention, the system comprises a communication network 102 and an IVR system 103. The communication network 102 may be a cellular-based communication network in which a customer 101 uses a handheld or other wireless device to access the communication network 102. The device may be any one or more of a mobile phone, a handheld device, a tablet, a computer, an Internet protocol (IP) phone, a public switched telephone network (PSTN) based phone, or any other device capable of communicating with the communication network 102. The communication network 102 may use any suitable communication technology that allows the customer 101 to communicate with the IVR system 103 via the customer device.

When the customer connects to the IVR system, the IVR system queries the customer as to the action or actions that the customer wants to perform. In an example, the IVR system may query the customer by using a phrase such as "How may I help you?" The customer responds to the query using a natural language response, which may be in any form and may use any terms which are comfortable for the customer.

The IVR system converts the response into text. The IVR system may use techniques that are based on a special grammar that is trained to identify certain keywords more accurately than others. An example of one of such grammar type is that of statistical language models (SLM) which take into consideration the sequence of words and make get the best transcription.

In embodiments of the invention, the IVR system also identifies the customer by constructing an identity key, K for the customer:

$$K => \text{Automatic Number Identification (ANI)+gender+ age group} \quad (1)$$

The IVR system may identify the gender and age group of the customer based on analysis of the response received from the customer. The IVR system may identify the gender of the customer based on the tones and/or frequency of the customer's speech in the response. The IVR system may identify the age group of the customer based upon the type of language and vocabulary used by the customer. Those skilled in the art will appreciate that other techniques and parameters may be used for customer identification and that the invention is not limited to the foregoing.

In embodiments of the invention, the IVR system also performs a customer relations management (CRM) system dip based on the predicted identity of the customer to obtain various attributes of the customer. For purposes of the discussion herein, a CRM dip is defined as accessing the Customer Relationship Management database that a company maintains to service their clients better. It is a database that keeps records of all of the events centering around the company's business with that particular customer. A data dip on such a database gives the system a view into the customer's recent activity or attributes. These attributes may comprise any of the history of the customer, e.g. browsing history, past interactions of the customer with the IVR system, and so on; attributes of the customer based on the identified age group and gender of the customer; and so on.

The IVR system performs a feature extraction from the text and generates a probability score, A of the customer intent based upon the feature vector of the text:

$$A=p(Ii|X) \quad (2)$$

where Ii is the ith intent I and X is the feature vector.

The IVR system computes the probability of intent Ii based on the customer historical behavior B. This is done seeing the intent sequence of the previous calls given the time and date. For example, if the caller has called for I1|I2 before I3 and it is known that the last 2 interaction's intent was I1 and I2, then the probability of current intent being I3 is high. Machine learning algorithms are typically employed for sequential data, such as Hidden Markov's Model (HMM) or Conditional Random Fields (CRF), which are some of the known graphical machine learning techniques.

The IVR system computes the score of each intent based on the CRM attributes C and based on general population based behavior. C takes into account the CRM attributes of the customer and scores are derived by a machine learning algorithm using these attributes. For example, one set of customer attributes could be:

Payment due date=3-Jan.-2012;
current_date=1-Jan.-2012;
balance_on_card=2000$; and
isAccountSuspended=True In such case, there is a high chance that the intent of call is to make a payment. The exact score can be computed by modeling general population behavior.

Finally, the IVR system scores each intent, given the above mentioned scores, and selects the maximum scoring intent. This scoring taken into account how much weightage the system is to give to personal attributes B relative to the population attributes C. This could be as simple as:

$$(W1*B+W2*C)/(B+C). \quad (3)$$

The IVR system compares the score of the selected intent to a predefined threshold. This threshold can either be set by business heuristics For example, determining a safe and sure threshold for intent prediction by observing caller behavior. The function which calculates the intent prediction scored is tuned to minimize intent rejection and maximize intent acceptance. The threshold could also be set by building a model. For example, once a proper function is written which takes into account an intent rejection and/or acceptance rate, optimization algorithms including genetic algorithms can be used to find out the best parameters to achieve this objective.

If the selected intent has a score greater than the threshold, then the IVR system optimizes the journey of the customer based on the selected intent. If the selected intent has a score that is less than the threshold, then the IVR system offers the standard IVR journey to the customer. After the journey is completed, the IVR system stores the speech response, the transcriptions of the speech responses, and the attributes.

The IVR system also picks up at least one sample of customer speech responses. This is the recording and transcription of the utterance where the customer is expressing his intent. The IVR system transcribes the responses into text. In an embodiment of the invention, the transcription may be a manual process. In another embodiment of the invention, the IVR system passes the speech responses through a batch automatic speech recognition (ASR) system. In an automatic transcription by an ASR, a language mode is typically used. Standard language modeling techniques, such as SLM take the manually transcribed data and build work sequence graphs for it. This does not require any labels.

At least one important feature is selected from the transcribed responses. At least one predicted label or tag can be used to classify the response and to give it a semantic expression, e.g. a label could indicate the intent of the customer who called in.

A feature is a rule that makes the final text model. In an embodiment of the invention, at least one important feature is selected from the transcribed responses manually. In an embodiment of the invention, at least one important feature is selected from the transcribed responses using statistical techniques. Again, the transcribed data goes through the feature extraction and feature scoring technique. An example of the feature is:
WORD(check) NEAR WORD(balance) WITHIN_DISTANCE(2),
which implies checking an account balance.

On extracting the features, the IVR system uses the features to enrich the grammar to recognize different variations of speech. Once the features are weighted and top features selected, these features can help identify the patterns that were missed by grammar rules and can be translated directly into the rules of grammar.

Further, the IVR system uses the features to enrich the grammar and improve the text mining model to address speech variations. The IVR system also uses the features to improve the text mining model, and thereby improve prediction of the customer intent when using the transcribed text.

Figure 2:
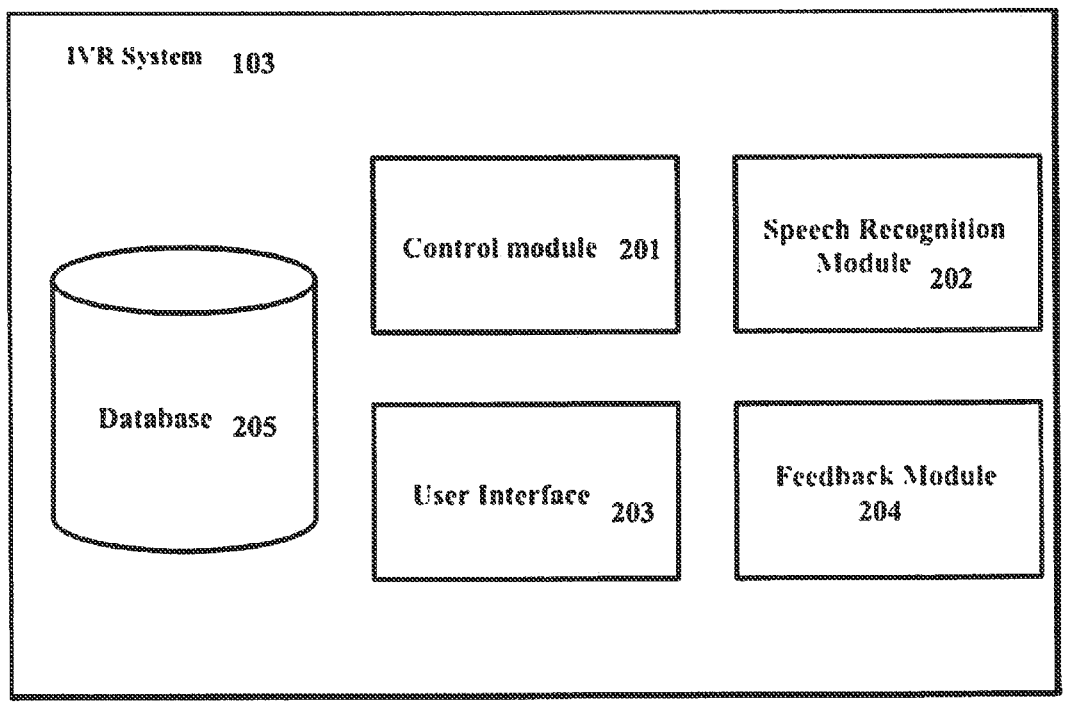
FIG. 2 is a block schematic diagram showing an IVR system according to the invention.

FIG. 2 is a block schematic diagram showing an IVR system according to the invention. The IVR system 103 comprises a control module 201, a speech recognition module 202, a user interface 203, a feedback module 204, and a database 205.

When the customer connects to the IVR system 103 via the user interface, the control module queries the customer with regard to the action or actions that the customer wishes to perform. Upon receiving a response from the customer, the control module forwards the response to the speech recognition module. The speech recognition module converts the response into text. The speech recognition module may use techniques based on a special grammar that is trained to identify certain keywords more accurately than others. The control module identifies the customer by constructing an identity key, K for the customer, as discussed above.

The control module may identify the gender and age group of the customer based on analysis of the response received from the customer. The control module, along with the speech recognition module, may identify the gender of the customer based on the tones and or frequency of the customer's speech in the response. The control module, along with the speech recognition module, may identify the age group of the customer based upon the type of language and vocabulary used by customer.

The control module also performs a CRM dip based on the predicted identity of the customer to identify various attributes of customer.

The control module performs a feature extraction from the text and produces a probability score, A of the intent provided the feature vector of the text, as discussed above.

The control module computes the probability of intent based on the customer's historical behavior B. The control module computes the score of each intent based on the CRM attributes C and based on general population based behavior. Finally, the control module scores each intent given the above mentioned scores and selects the maximum scoring intent.

The control module compares the score of the selected intent to a predefined threshold. If the selected intent has a score that is greater than the threshold, then the control module optimizes the journey of the customer based on the selected intent. If the selected intent has a score less than the threshold, then the control module offers a standard IVR journey to the customer. After the journey is completed, the control module stores the speech response, the transcriptions of the speech responses, and the attributes in the database.

The feedback module 204 picks up at least one sample of the customer's speech responses from the database 205 and sends the speech response to the speech recognition module 202. The speech recognition module transcribes the responses into text. The speech recognition module passes the transcribed responses to the feedback module, which selects at least one important feature from the transcribed responses. In an embodiment of the invention, at least one important feature is selected from the transcribed responses manually. In an embodiment of the invention, at least one important feature is selected from the transcribed responses using statistical techniques. This can be the same feature used in the text mining model.

On extracting the features, the feedback module uses the features to enrich the grammar to recognize variations in the customer's speech. Further, the feedback module uses the features to enrich the grammar and improve the text mining model to account for such variations in the customer's speech. The feedback module also uses the features to improve the text mining model, and thereby improve prediction of the customer's intent when using transcribed text.

Figure 3A:
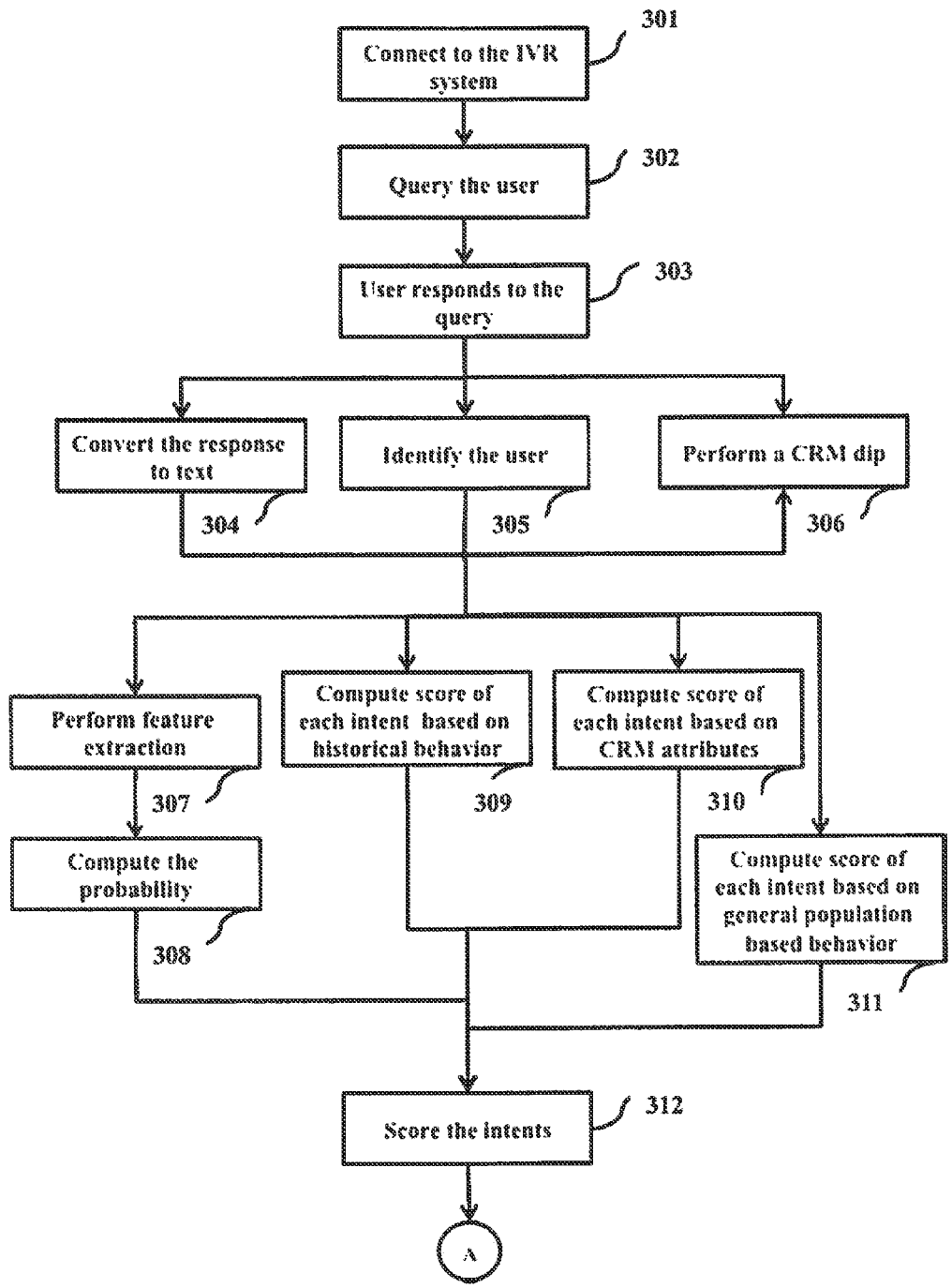
FIGS. 3A and 3B together provide a flowchart that shows a method for intent prediction according to the invention.
Figure 3B:
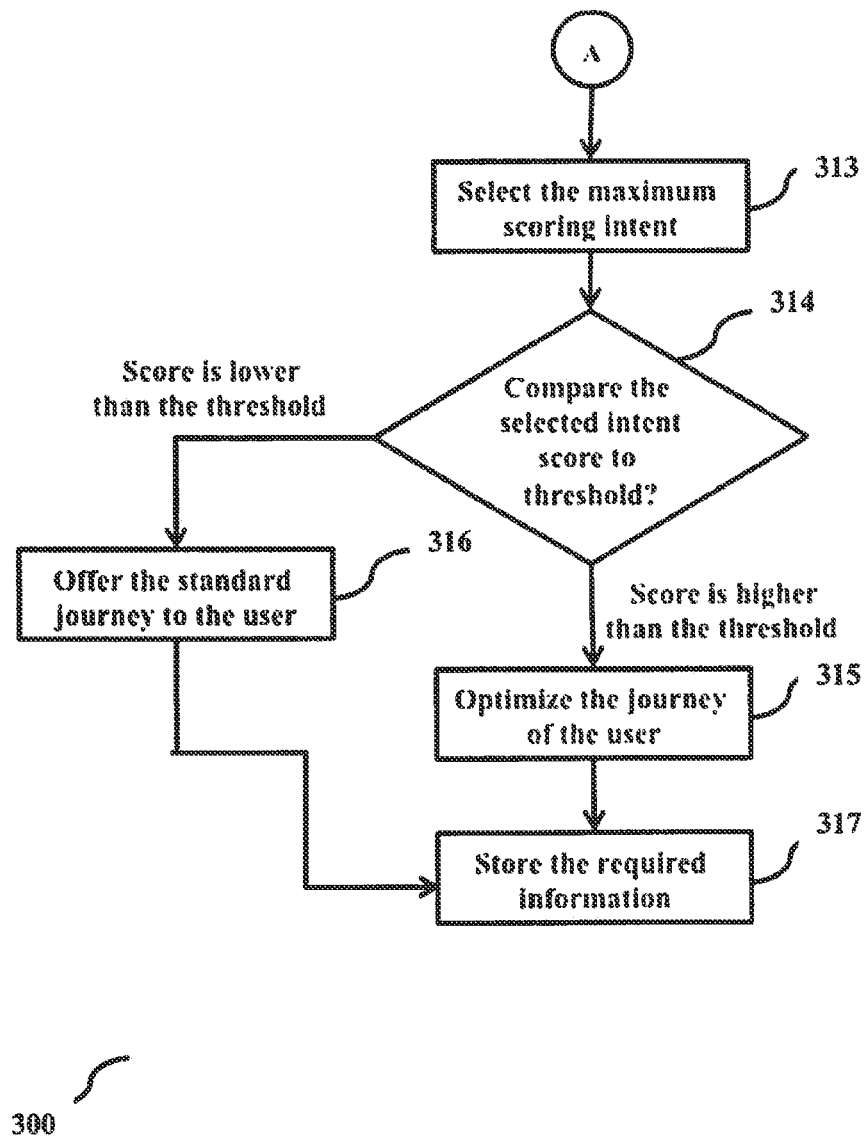

FIGS. 3A and 3B together provide a flowchart that shows a method for intent prediction according to the invention. When the customer connects (301) to the IVR system, the IVR system queries (302) the customer with regard to the action or actions that the customer wishes to perform. In an example, the IVR system may query the customer using a phrase such as "How may I help you?" The customer responds (303) to the query using a natural language response, which may be in any form and may use any terms which are comfortable for the customer. The IVR system converts (304) the response into text. The IVR system may use techniques based on a special grammar that is trained to identify certain keywords more accurately than others.

The IVR system also identifies (305) the customer by constructing an identity key for the customer. The IVR system may identify the gender and age group of the customer based on analysis of the response received from the customer. The IVR system may identify the gender of the customer based on the tones and or frequency of the speech in the customer's response. The IVR system may also identify the age group of the customer based upon the type of language and vocabulary used by the customer.

The IVR system also performs (306) a CRM dip based on the customer's predicted identity to get attributes of the customer. The IVR system performs (307) a feature extraction from the text and generates (308) a probability score for the intent identified by the feature vector of the text. The IVR system computes (309) the probability of intent based on the customer historical behavior, as discussed above. The IVR system computes (310) a score of each intent based on the CRM attributes. The IVR system also computes (311) the score of each intent based on behaviors across the general population.

Finally, the IVR system scores (312) each intent, given the above mentioned attributes, and selects (313) the maximum scoring intent. The IVR system compares (314) the score of the selected intent to a predefined threshold. If the selected intent has a score that is greater than the threshold, then the IVR system optimizes (315) the journey of the customer based on the selected intent. If the selected intent has a score that is less than the threshold, then the IVR system offers (316) a standard IVR journey to the customer. After the journey is completed, the IVR system stores (317) the speech response, the transcriptions of the speech responses, and the attributes in the database. For purposes of understanding the invention, it should be appreciated that various actions described herein in connection with FIGS. 3A and 3B may be performed in the order presented, in a different order, simultaneously, or some of these actions may be omitted altogether.

Figure 4:
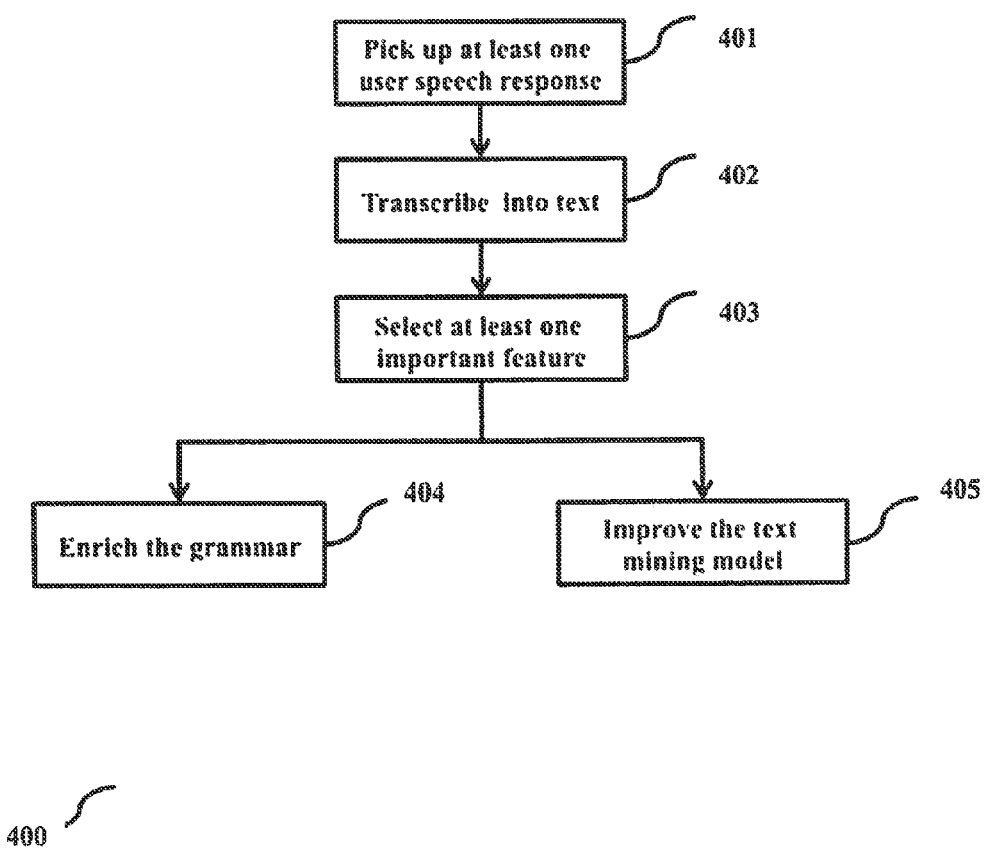
FIG. 4 is a flowchart that shows a method for feedback and learning according to the invention.

FIG. 4 is a flowchart that shows a method for feedback and learning according to the invention. The IVR system 103 (see FIG. 1) picks up (401) at least one sample of the customer's speech responses and transcribes (402) the responses into text. In an embodiment of the invention, the transcription may be a manual process. In another embodiment of the invention, the IVR system passes the speech responses through a batch ASR system, which transcribes the responses using at least one predicted label, and at least one important feature is selected (403) from the transcribed responses. In an embodiment of the invention, at least one important feature is selected from the transcribed responses manually. In an embodiment of the invention, at least one important feature is selected from the transcribed responses using statistical techniques.

Upon extracting the features, the IVR system enriches (404) the grammar using the grammar to recognize different variations of speech. Further, the IVR system improves (405) the text mining model uses the features to take into account variations of speech. For purposes of understanding the invention, it should be appreciated that various actions described herein in connection with FIG. 4 may be performed in the order presented, in a different order, simultaneously, or some of these actions may be omitted altogether.

Embodiments of the invention allow the use of natural language queries in an IVR system, while providing a very flexible approach to grammar tuning. Embodiments of the invention integrate text mining, along with the transcriptions, thus providing flexibility. Embodiments of the invention use an automatic learning feedback loop, along with flexible learning techniques, to improve text mining models. Embodiments of the invention also leverage a customer's past behavior and segment behavior to reinforce the intent prediction that is made for the customer.

Embodiments of the invention allow customers to make a natural language queries to specify their intent, while maintaining the accuracy of traditional IVR systems. Embodiments of the invention use key features in language along with the customer's past transactions, CRM attributes, and customer segment attributes to identify customer intent.

Computer Implementation

Figure 5:
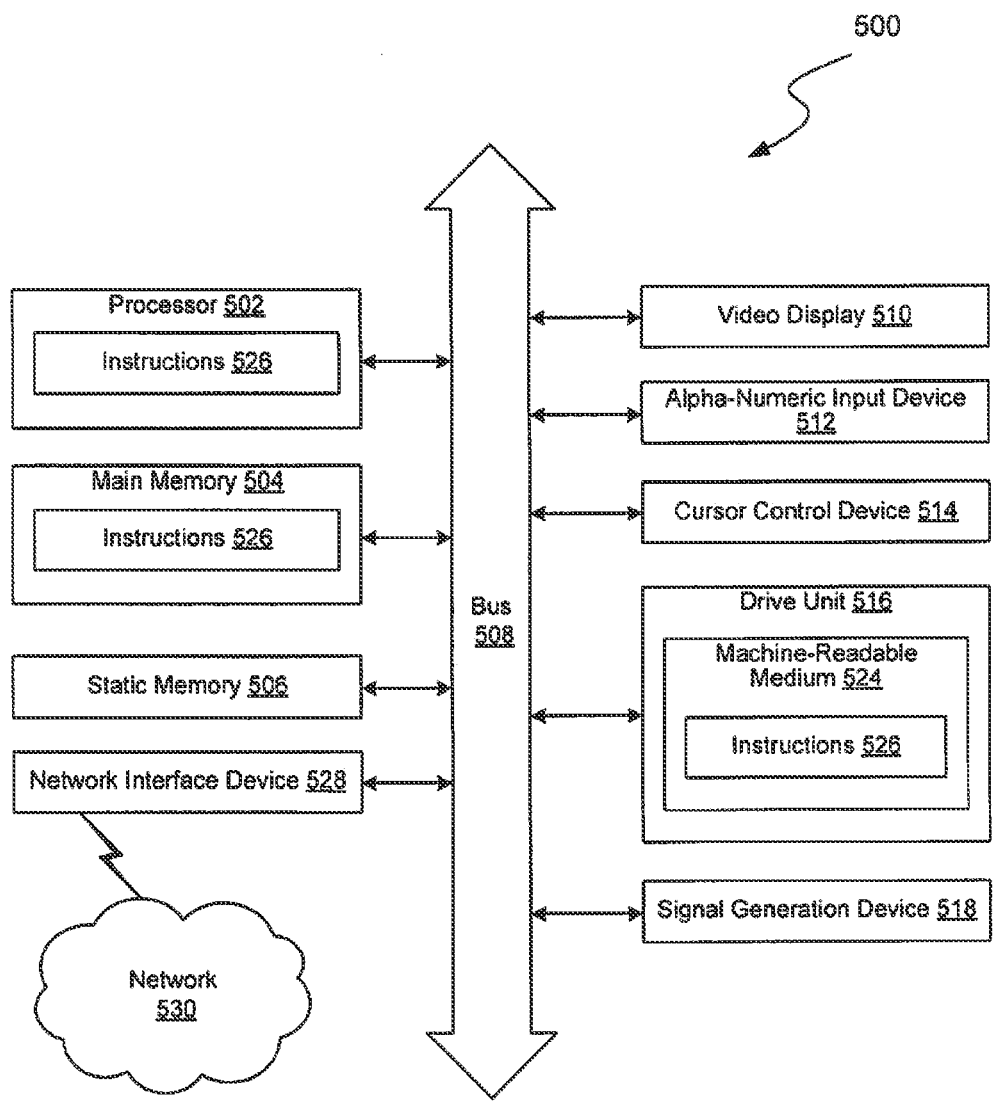
FIG. 5 is a block schematic diagram that depicts a machine in the exemplary form of a computer system within which a set of instructions for causing the machine to perform any of the herein disclosed methodologies may be executed.

FIG. 5 is a block schematic diagram that depicts a machine in the exemplary form of a computer system 500 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 500 includes a processor 502, a main memory 504, and a static memory 506, which communicate with each other via a bus 508. The computer system 500 may further include a display unit 510, for example, a liquid crystal display (LCD). The computer system also includes an alphanumeric input device 512, for example, a keyboard; a cursor control device 514, for example, a mouse; a disk drive unit 516; a signal generation device 518, for example, a speaker; and a network interface device 528.

The disk drive unit 516 includes a machine-readable medium 524 on which is stored a set of executable instructions, i.e. software, 526 embodying any one, or all, of the methodologies described herein below. The software 526 is also shown to reside, completely or at least partially, within the main memory 504 and/or within the processor 502. The software 526 may further be transmitted or received over a network 530 by means of a network interface device 528.

In contrast to the system discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core, such as the CPU of a computer, or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method of an interactive voice response (IVR) system for responding to natural language queries to identify customer intent during a customer interaction, comprising:
identifying, by a processor, the customer intent based on key features in a natural language used by a customer during said customer interaction, along with past interactions of said customer with the IVR system, customer relations management (CRM) system attributes, and customer segment attributes, said identifying including:
converting speech in a customer's response during the customer interaction into text, wherein the customer response is in the natural language;
determining a predicted identity of the customer based on a gender of the customer and an age group of the customer, said determining including identifying the gender based on an analysis of a tone and/or frequency of speech in the customer response and identifying the age group based on an analysis of a type of language and vocabulary used in the customer response;
accessing a customer relations management (CRM) system to obtain the CRM attributes associated with the customer and the customer segment attributes, wherein the CRM attributes include past interactions of the customer with the IVR system, wherein the customer segment attributes include attributes associated with the gender and the age group identified based on the customer response;
extracting at least one key feature from the text, wherein the at least one key feature is an identified keyword based on a statistical model;
computing a probability score of at least one intent associated with the at least one key feature, wherein the probability score of the at least one intent is computed based on the past interactions of the customer and the customer segment attributes, the past interactions including an intent sequence of previous customer interactions.

2. The method of claim 1, further comprising:
providing a communication network and the interactive voice response (IVR) system, wherein said communication network allows said customer to communicate with said IVR system via a customer device during said customer interaction.

3. The method of claim 2, further comprising:
querying, by said IVR system, said customer regarding an action or actions that said customer wants to perform during said customer interaction.

4. The method of claim 2, further comprising:
said IVR system picking up at least one sample of customer speech responses; and
said IVR system transcribing said responses into text;
wherein said IVR system passes said speech responses through a batch automatic speech recognition (ASR) system, which transcribes said responses using at least one predicted label, and where at least one important feature is selected from said transcribed responses.

5. The method of claim 4, wherein said at least one important feature is selected from said transcribed responses using statistical techniques.

6. The method of claim 2, further comprising:
a control module querying said customer with regard to an action or actions that said customer wishes to perform when said customer connects to said IVR system via a user interface;
upon receiving a response from said customer, said control module forwarding said response to a speech recognition module; and
said speech recognition module converting said response into text using techniques based on a special grammar that is trained to identify certain keywords more accurately than others.

7. The method of claim 6, further comprising:
said control module identifying said customer by constructing an identity key, K for the customer.

8. The method of claim 6, further comprising:
said control module identifying gender and age group of said customer based on analysis of a response received from said customer.

9. The method of claim 2, further comprising:
a feedback module picking up at least one sample of the speech responses of said customer from a database and sending said at least one sample of the speech responses to a speech recognition module;
said speech recognition module transcribing said responses into text;
said speech recognition module passes the transcribed responses to a feedback module, which selects at least one important feature from said transcribed responses, wherein at least one important feature is selected from said transcribed responses using statistical techniques; and
on extracting features, said feedback module using said features to enrich a grammar to recognize variations in speech of said customer, to improve a text mining model to account for such variations in said speech of said customer, and to improve prediction of said customer's intent when using transcribed text.

10. The method of claim 1, wherein said converting said customer response includes:
using techniques that are based on a special grammar that is trained to identify certain keywords more accurately than others.

11. The method of claim 1, wherein determining the predicted identity further includes:
constructing an identity key, K for the customer:

$K =>$ Automatic Number Identification (ANI)+gender+age group.

12. The method of claim 1, further comprising:
performing a feature extraction from said text and generating a probability score, A of said customer's intent based upon a feature vector X of said text:

$$A = p(I_i | X)$$

where $I_i$ is ith intent I and X is the feature vector.

13. The method of claim 12, further comprising:
computing, by said IVR system, a probability of intent $I_i$ based on a historical behavior of said customer.

14. The method of claim 13, further comprising:
said IVR system computing a score of each intent based on CRM attributes C and based on general population based behavior.

15. The method of claim 14, further comprising:
said IVR system scoring each intent, given computed scores; and
said IVR system selecting a maximum scoring intent.

16. The method of claim 15, further comprising:
said IVR system comparing the selected maximum scoring intent to a predefined threshold;
wherein when the selected maximum scoring intent is greater than said predefined threshold, said IVR system optimizes a journey of the customer based on the selected intent; and
wherein when the selected maximum scoring intent that is less than said predefined threshold, said IVR system offers a standard IVR journey to said customer.

17. The method of claim 16, further comprising:
after the journey of the customer is completed, said IVR system storing a speech response, transcriptions of said speech in customer's response, and customer attributes.

18. The method of claim 12, wherein performing the feature extraction further comprises:
on extracting features of the feature vector X from the text, using, by said IVR system, said features to enrich a grammar to recognize different variations of speech, to improve a text mining model to address speech variations, and to improve prediction of customer intent when using transcribed text.

* * * * *